Figure 1:
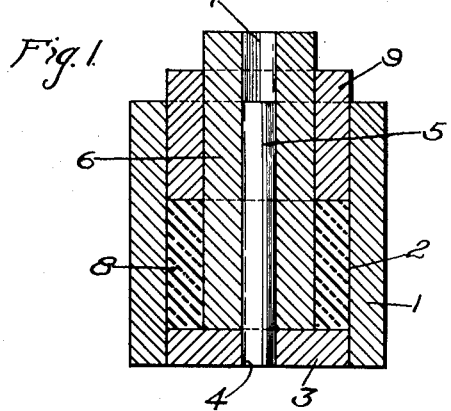

W. H. KEMPTON.
MOLD.
APPLICATION FILED SEPT. 3, 1919.

1,352,457.

Patented Sept. 14, 1920.

WITNESSES:
J. B. Merrill
O. E. Bee.

INVENTOR
Willard H. Kempton
BY
Wesley G. Carr
ATTORNEY

UNITED STATES PATENT OFFICE.

WILLARD H. KEMPTON, OF WILKINSBURG, PENNSYLVANIA, ASSIGNOR TO WESTINGHOUSE ELECTRIC & MANUFACTURING COMPANY, A CORPORATION OF PENNSYLVANIA.

MOLD.

1,352,457.      Specification of Letters Patent.      Patented Sept. 14, 1920.

Original application filed April 4, 1919, Serial No. 287,580. Divided and this application filed September 3, 1919. Serial No. 321,496.

*To all whom it may concern:*

Be it known that I, WILLARD H. KEMPTON, a citizen of the United States, and a resident of Wilkinsburg, in the county of Allegheny and State of Pennsylvania, have invented a new and useful Improvement in Molds, of which the following is a specification, this being a division of application, Serial No. 287,580, filed April 4, 1919.

My invention relates to molds, and it has for its primary object, the provision of molds which are particularly adapted for molding composite articles in such manner as to insure the proper disposition of the employed material in the articles.

It is desirable that some articles such, for example, as machine elements, have self-lubricating qualities and, at the same time, be non-conductors of electricity. In such instances, the utilization of graphite, in any considerable quantity, as a lubricant, is prohibited for distribution throughout the entire structure of the article, for the reason that the graphite, being a good conductor, permits of the passage of current through the article. Because of this, it is often desirable to construct the articles by employing a plurality of moldable compositions, one of which contains graphite, as a lubricant, and the other of which is non-conducting, the compositions being so positioned, relative to each other, that the desired properties, both of insulation and lubrication are attained.

Another object of my invention, therefore, resides in the construction of molds which are particularly adapted for molding articles of the above described character.

With these and other objects in view, my invention will be more fully described, illustrated in the drawings, in the several views of which corresponding numerals indicate like parts, and then particularly pointed out in the appended claims.

Figure 2:
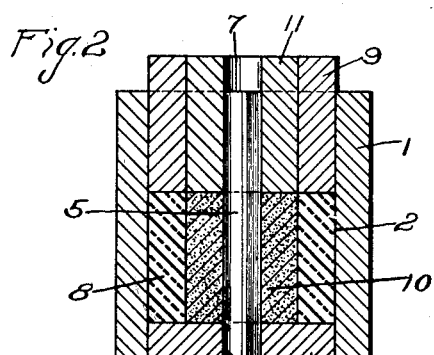
Figure 3:
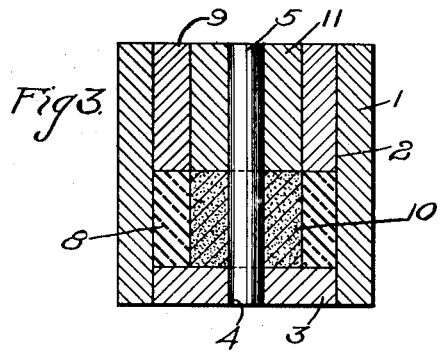
Figure 6:
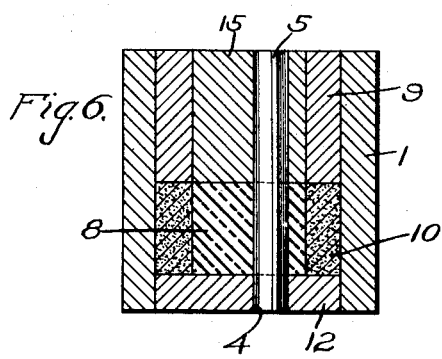
Figure 4:
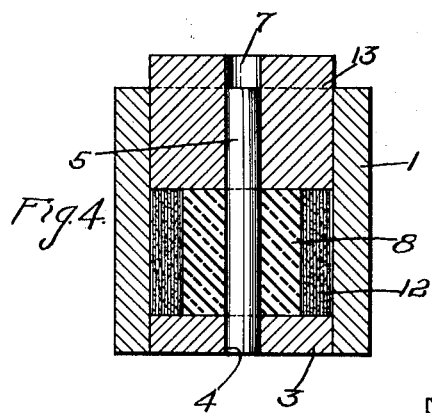
Figure 5:
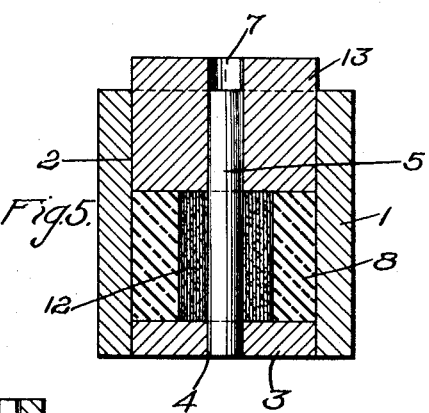
Figure 7:
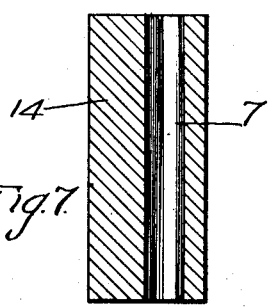

In the drawings, Figure 1 is a vertical section of a mold embodying my invention and showing the initial step in molding a composite article, such as a pulley or roller; Fig. 2 is a sectional view, similar to Fig. 1, in which the two materials employed in molding a composite article are shown positioned in the mold previous to the application of pressure to complete the compacting of the materials; Fig. 3 is a sectional view, similar to Fig. 2, showing the pressure members in their final positions; Fig. 4 is a sectional view, similar to Fig. 3, illustrating a modification of my invention; Fig. 5 is a sectional view of a mold which may be employed in constructing articles having a different disposition of materials therein; Fig. 6 is a sectional view, showing another slightly modified mold by which cams and articles of similar nature may be formed in accordance with my invention, and Fig. 7 is a sectional view of a member employed in place of one of the members shown in Fig. 6, during one step of my method.

In practising my invention, I may employ a mold in which a moldable material having great mechanical strength, as well as insulating properties, may be positioned and slightly compressed about a spacing member, which may be removed after the material about it has been slightly compressed. The subsequent removal of the spacing member provides an opening in which another material, having a lubricant uniformly distributed in it, may be placed, after which, pressure members, adapted to engage the two materials thus disposed in the mold, may be placed thereon and pressure exerted to compact both the materials into a hard unitary article. Heat may be applied throughout the entire molding process or after the materials have been compressed, as seems most desirable. The positioning and treatment of the materials placed in the mold will be more fully described in the following paragraphs.

In Fig. 1 is shown a mold body 1, having a chamber 2 opening through its ends, and closed at one end by a removable bottom 3 having an opening 4 in which one end of a centering pin or rod 5 may be placed. If the composite article, to be molded in accordance with my invention, is in the nature of a pulley or roller requiring a cylindrical axial opening, the bottom 3 will be provided with a central opening 4 in which one end of the rod 5 may be placed, thus disposing the rod axially in the chamber 2. A spacing member or sleeve 6, having an opening 7 to receive the rod 5, may then be slipped over the rod 5, and a moldable material 8 may be placed around the spacing member 6 to rest upon the bottom 3 and to fill the space between the mold body 1 and sleeve 6 to the desired depth. A pressure ring 9 may then be placed between the spacing member 6 and the inner wall of the mold 1, and pressure may be applied to this ring to compress the material sufficiently to so compact it, as shown in Fig. 1, that, when the spacing member 6 is removed, the material will retain its position and form.

Another moldable material 10, containing a lubricant, such as graphite, may now be placed in the space provided by removing the spacing member 6, and a pressure member or ring 11, similar to the pressure member 9, may be placed about the rod 5 to engage the material last added and, with the member 9 and rod 5, completely close the top of the chamber 2, whereby pressure may be applied to the entire surface of the material disposed in the mold. Pressure may then be applied uniformly to the pressure members 9 and 11, while the mold is heated, thus compressing the two materials in the mold to form a solid unitary body.

In molding articles of the above described character, the material 8, which is first positioned in the mold and subjected to slight compression, may be a shredded material, a fabric, a loose fibrous material, such as cotton batting, or a granular or finely divided material, such as wood flour, the material, whatever it may be, being impregnated with a suitable binder such, for example, as a phenolic condensation product. When loose material is employed, an initial pressure, transmitted by the pressure member 9, is essential to so compact the material 8 that it shall retain its position and shape when the spacing member 6 is removed. The material 10, which is employed to partially fill the space provided by the removal of the spacing member 6, may be the same as the material 8, with a lubricant, such as graphite, distributed through it.

The mold shown in Fig. 4 may be employed to construct an article composed of material of a different character from that of the material above mentioned. The material 12 may be a fibrous sheet material, such as paper, duck or muslin, impregnated with a binder containing a lubricant. The material 12 may be wound to form a tube of such proportions that, when placed in the mold 1, it will engage the wall of the mold and remain in spaced relation to the centering rod 5. On account of the ability of the material 12, which is first placed in the mold 1, to maintain its position and shape, the mold 1 differs from the molds shown in Figs. 1 to 3, inclusive, in that no spacer member is needed, and the pressure member 13 replaces both pressure members 9 and 11. The material 8, which may be utilized to fill the space between the rod 5 and the material 12, may be a loose fibrous material or a sheet material, impregnated with a suitable binder, such as a phenolic condensation product. If the material 8 is a sheet material, it may be wound to form a tube of proper dimensions. The pressure member 13, having a central opening 7, may be slipped over the rod 5 to engage the materials disposed in the mold 1 and pressure be applied thereto, while the mold is heated, to compact the materials into a hard and unitary body.

The mold shown in Fig. 5 corresponds, in detail, to the mold illustrated in Fig. 4, this view being employed in order to illustrate another disposition of materials in the mold. In this case, the material 12 may be wound about the centering rod 5 to a suitable thickness and be so placed in the mold that a space shall be reserved between the material 12 and the wall of the mold 1, which may be filled by the material 8. The pressure member 13 may then be placed upon the materials in the mold 1, and pressure and heat may be applied to compact the materials into a hard and unitary body.

Fig. 6 illustrates one type of mold, embodying my invention, which may be employed in constructing cams and articles of a similar nature. Fig. 7 shows the spacing member 14 which replaces the spacing member 6, shown in Fig. 1, and has the opening 7 so formed as to be in alinement with the eccentrically located opening 4 in the bottom 12, corresponding to the bottom 3. The spacing member 14 may be slipped over the centering rod 5, and the material 10, which is the material containing the lubricant, may be placed in the mold 1 and subjected to slight compression, transmitted by the pressure member 9. The spacing member 14 may then be removed and the material 8 disposed in the space provided thereby. The pressure member 15, which corresponds, in shape, to the spacing member 14 but is of less length, may be so positioned about the centering rod 5 that, in conjunction with the pressure member 9, pressure may be applied to compact the materials in the mold, heat being applied either during or after this compression.

It is obvious that, although the molds described and illustrated in the drawings are cylindrical, various shapes may be employed, especially in the construction of self-lubricating gears or cams which must have irregular surfaces.

Although I have specifically described several molds and modifications thereof, which are adapted for molding composite articles, such as pulleys and cams, it is obvious that minor changes may be made in their construction to permit of molding of other machine elements, such as gears, without departing from the spirit of my invention and I desire, therefore, that no limitations shall be imposed except such as are indicated in the appended claims.

I claim as my invention:—

1. A mold comprising a body portion having a chamber, means for compressing a substantially annular body therein, means for reserving a space in the chamber, and means for compressing a body disposed in the reserved space.

2. A mold comprising a body portion having a substantially annular mold chamber, means for compressing a tubular body therein, means for reserving a space in the mold chamber, and means for compressing a body disposed in the reserved space.

3. A mold comprising a body portion having a substantially annular mold chamber, means for compressing a tubular body therein, means for reserving a substantially annular space in the mold chamber, and means for compressing a body disposed in the reserved space.

4. A mold comprising a body portion having a chamber, a removable member closing one end of the chamber and provided with an opening, a rod adapted to seat in the opening, a removable spacing member having an opening to receive the rod, a pressure member corresponding to the spacing member but of less length, and a second pressure member adapted to fill the space in the mold chamber between the spacing member or the first pressure member and the inner surface of the wall of the mold.

5. A mold comprising a body portion having a chamber, a removable member closing one end of the chamber and provided with an opening, a rod adapted to seat in the opening, and means fitting in the chamber and about the rod for compressing material placed in the chamber, said means comprising separable sections.

In testimony whereof, I have hereunto subscribed my name this 25th day of Aug., 1919.

WILLARD H. KEMPTON.